US009009972B2

(12) United States Patent
Stalcup, II et al.

(10) Patent No.: US 9,009,972 B2
(45) Date of Patent: Apr. 21, 2015

(54) METHOD FOR MANUFACTURING EXHAUST CONNECTION MEMBER WITH PREFORMED BRAIDED COVER

(71) Applicant: Tru-Flex, LLC, West Lebanon, IN (US)

(72) Inventors: Robert Franklin Stalcup, II, Covington, IN (US); Scott Robert Swank, Williamsport, IN (US)

(73) Assignee: Tru-Flex, LLC, West Lebanon, IN (US)

( * ) Notice: Subject to any disclaimer, the term of this patent is extended or adjusted under 35 U.S.C. 154(b) by 321 days.

(21) Appl. No.: 13/690,122

(22) Filed: Nov. 30, 2012

(65) Prior Publication Data
US 2013/0087243 A1   Apr. 11, 2013

Related U.S. Application Data

(62) Division of application No. 12/942,684, filed on Nov. 9, 2010, now Pat. No. 8,382,165.

(51) Int. Cl.
F16L 27/10 (2006.01)
F01N 13/18 (2010.01)
F16L 27/111 (2006.01)
F16L 51/02 (2006.01)

(52) U.S. Cl.
CPC ......... *F16L 27/1004* (2013.01); *F01N 13/1816* (2013.01); *F01N 2470/12* (2013.01); *F16L 27/111* (2013.01); *F16L 51/027* (2013.01)

(58) Field of Classification Search
CPC .................................... F01N 13/1816
USPC .............. 29/890.08; 87/34, 35; 72/370.01, 72/370.02, 370.04, 370.05, 370.12, 72/370.13; 138/109, 124, 127, 121; 140/92.1, 92.2; 285/222.5, 226; 60/322–324
See application file for complete search history.

(56) References Cited

U.S. PATENT DOCUMENTS

| | | | |
|---|---|---|---|
| 4,315,558 A | 2/1982 | Katayama | |
| 5,340,165 A | 8/1994 | Sheppard | |
| 5,660,419 A * | 8/1997 | Kim | 285/226 |
| 5,769,463 A | 6/1998 | Thomas | |
| 5,806,899 A | 9/1998 | Norikawa et al. | |
| 5,813,704 A * | 9/1998 | Naito | 285/226 |
| 5,882,046 A | 3/1999 | Thomas | |
| 5,924,282 A | 7/1999 | Thomas | |

(Continued)

FOREIGN PATENT DOCUMENTS

| | | |
|---|---|---|
| DE | 4243115 A1 | 7/1993 |
| EP | 0709558 A1 | 5/1996 |

(Continued)

*Primary Examiner* — David Bryant
*Assistant Examiner* — Steven A Maynard
(74) *Attorney, Agent, or Firm* — Barnes & Thornburg LLP

(57) ABSTRACT

An exhaust connection coupler and a method for manufacturing a braid cover incorporated therein are provided. The method of manufacturing comprises the steps of providing a tubular sleeve formed of braided wire filaments and forming at least one end of the sleeve into shape using a forming die such that the at least one end of the cover includes a circumferential neck portion having a diameter smaller than the diameter of a body portion of the cover. In the method, the sleeve may be pressed between male and female forming dies in order to create the cover's desired shape, which can include a shoulder extending radially outwardly from the cover's neck portion and meeting the cover's body portion at a corner.

12 Claims, 8 Drawing Sheets

(56) References Cited

U.S. PATENT DOCUMENTS

| | | |
|---|---|---|
| 6,220,023 B1 | 4/2001 | Ezzeddini et al. |
| 6,230,748 B1 | 5/2001 | Krawietz et al. |
| 6,312,021 B1 | 11/2001 | Thomas |
| 6,902,203 B2 * | 6/2005 | Kang ............ 285/226 |
| 6,921,112 B2 | 7/2005 | Atansoski et al. |
| 7,066,495 B2 | 6/2006 | Thomas et al. |
| 7,264,280 B2 | 9/2007 | Kim |

FOREIGN PATENT DOCUMENTS

| | | |
|---|---|---|
| EP | 0974741 A1 | 1/2000 |
| GB | 2311110 A | 9/1997 |

* cited by examiner

METHOD FOR MANUFACTURING EXHAUST CONNECTION MEMBER WITH PREFORMED BRAIDED COVER

CROSS-REFERENCE TO RELATED APPLICATIONS

This Application is a divisional of and claims priority to U.S. patent application Ser. No. 12/942,684 filed Nov. 9, 2010 to Robert F. Stalcup II, et al. for an Exhaust Connection Member with Preformed Braided Cover, currently pending, the entire disclosure of which is incorporated herein by reference.

BACKGROUND OF THE INVENTION

As is generally known, some automotive exhaust systems employ a flexible connection member or coupler disposed between two exhaust pipes in order to absorb undesirable vibrations input into the exhaust piping, absorb any thermal expansion or contraction of the exhaust piping, and compensate for any misalignments in the exhaust piping. These couplers are generally formed of an inner flexible metal bellows member and an outer braid cover surrounding the outer periphery of the bellows member. Exemplary of such a coupler is U.S. Pat. No. 5,769,463 to Thomas. The braid cover is normally in very close proximity to, if not in direct contact with, the bellows. Such a placement of the braid cover often leads to friction between the bellows and the braid cover thereby resulting in wearing and premature failure of the bellows and braid cover. In currently known embodiments where the braid cover is spaced at any significant distance from the bellows member, such as in U.S. Pat. No. 6,902,203 to Kang, the braid cover has to be supported by some rigid support means in order to maintain that spacing.

It is well known in the industry that one source of energy loss and inefficiency in internal combustion engines is the loss of heat through exhaust gases. Heat lost though the engine's exhaust gas results in a loss of energy that would otherwise be in the form of mechanical energy produced by the engine. Furthermore, keeping heat in the exhaust gases speeds the gases up in their travel though the exhaust system thereby reducing the amount of back pressure on the engine. Thus, it is desirable for internal combustion engines to have exhaust systems that lose as little heat as possible.

It is also known in the industry to construct the braid cover of many bundles of fine metal wires. The bundles are knitted alternatively to each other in a spiral direction. Normally, the spacing between the bundles and the density of the braid cover is not of importance other than to ensure that the braid cover generally protects the bellows from sand, gravel and other road debris. It is unknown in the prior art to form the braid cover in a manner wherein it creates a thermally insulating layer around the bellows.

Accordingly, a need exists for a braid cover that includes a self-supporting portion spaced at a distance from a bellows member in order to create a meaningful air gap therebetween. A need also exists for a method for manufacturing such a braid cover. A further need exists for a coupler that has increased insulating properties in order to maintain heat within the exhaust gas flowing through the coupler.

SUMMARY OF THE INVENTION

The present invention involves the provision of an exhaust connection coupler and a method for manufacturing a braid cover incorporated therein. The coupler may include an inner flexible bellows member and an outer braid cover surrounding the bellows member. The braid cover may be formed into a predetermined shape prior to assembly with the remainder of the coupler. The braid member can include a generally cylindrical body section and two end sections each forming necks having diameters that are smaller than the diameter of the body section. Such an arrangement enables the body section of the braid cover to be positioned at a predetermined space from the bellows member. The unique design of the braid cover is such that the body section is self-supporting and does not require any additional support means for maintaining its space from the bellows member. The braid member may be formed of bundles of metallic filaments that are intertwined in a fashion so as to create a dense coverage over the bellows member thereby allowing the braid cover to act as a thermally insulating layer. A thermally insulating air gap is defined between the braid cover and the bellows member in order increase the amount of heat maintained within exhaust gas flowing through the coupler.

Another aspect of the present invention is directed to a method for manufacturing the braid cover. In this method, wire filaments may be intertwined on a mandrel to form a sleeve-like article. The sleeve-like article may then be shaped with forming dies into a resulting braid cover. In one embodiment, the sleeve-like article is placed around a male forming and then pressed between the male forming die and a female forming die to shape the article into the desired shape of the braid cover.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

DETAILED DESCRIPTION OF THE INVENTION

Figure 1:
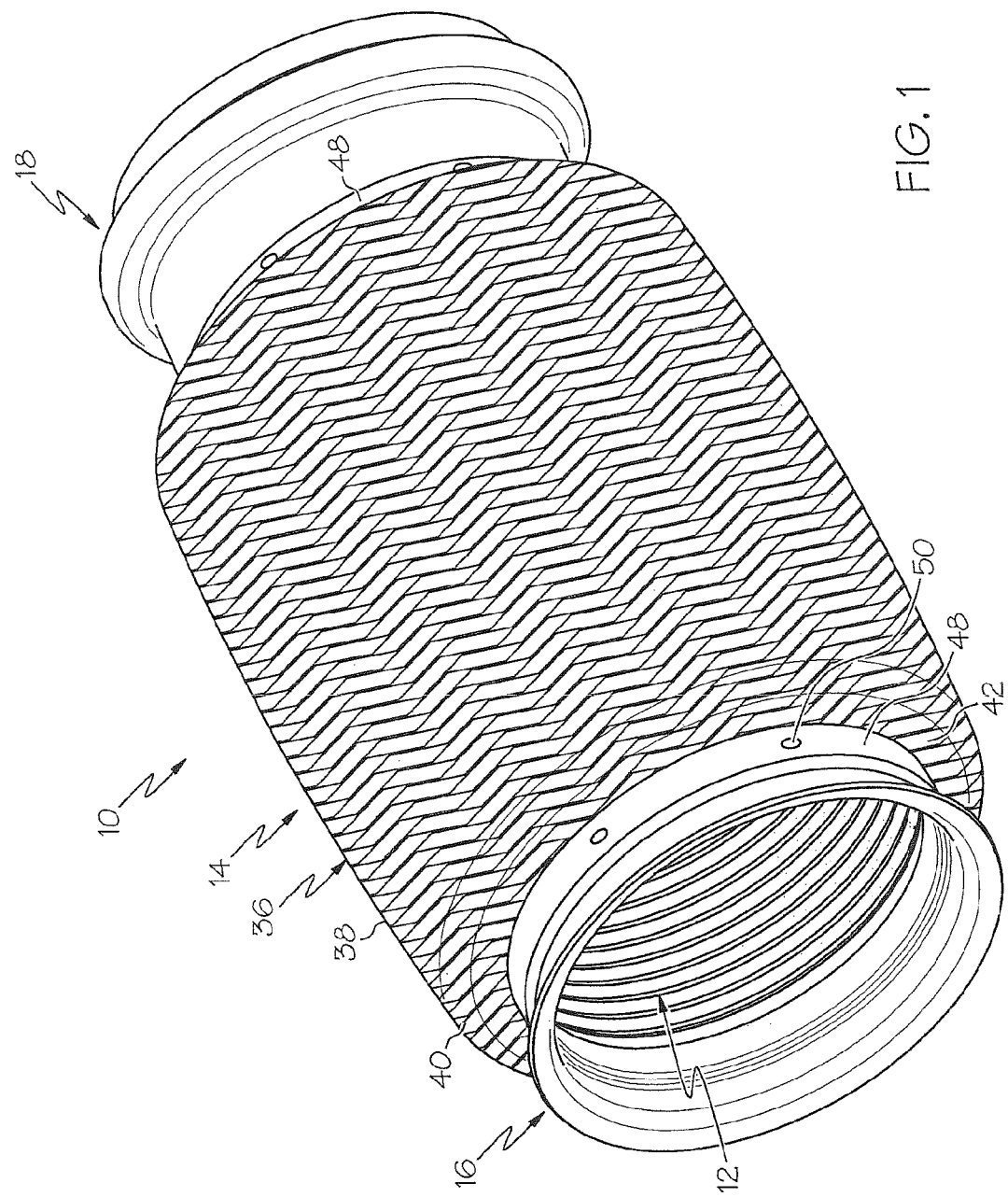
FIG. 1 is a side perspective view of an exhaust connection coupler in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The present invention is directed generally toward an exhaust connection member or coupler 10 and a method for manufacturing a braid cover 14 incorporated therein. As shown in FIG. 1, the coupler 10 includes a flexible bellows member 12, a braid cover 14 surrounding the bellows member 12, first and second end flanges 16 and 18, and end rings or collars 48 for securing the end parts of the bellows member 12 and braid cover 14 together. The coupler 10 may optionally include an interlock flex liner member (not shown) disposed inwardly of the bellows member 12.

The bellows member 12, which may be formed of a metallic material, is comprised of first and second tube-like ends 20 and 22 with a plurality of repeating corrugations 24 extending therebetween. The bellows member 12 is flexible thereby serving to effectively absorb any linear thermal expansion and contraction of the exhaust piping (not shown) to which the coupler 10 is connected, absorb undesirable vibrations input into the exhaust piping and compensate for misalignments in the exhaust piping. The bellows member 12 defines a passageway 26 through which the exhaust gases flow.

Figure 2:
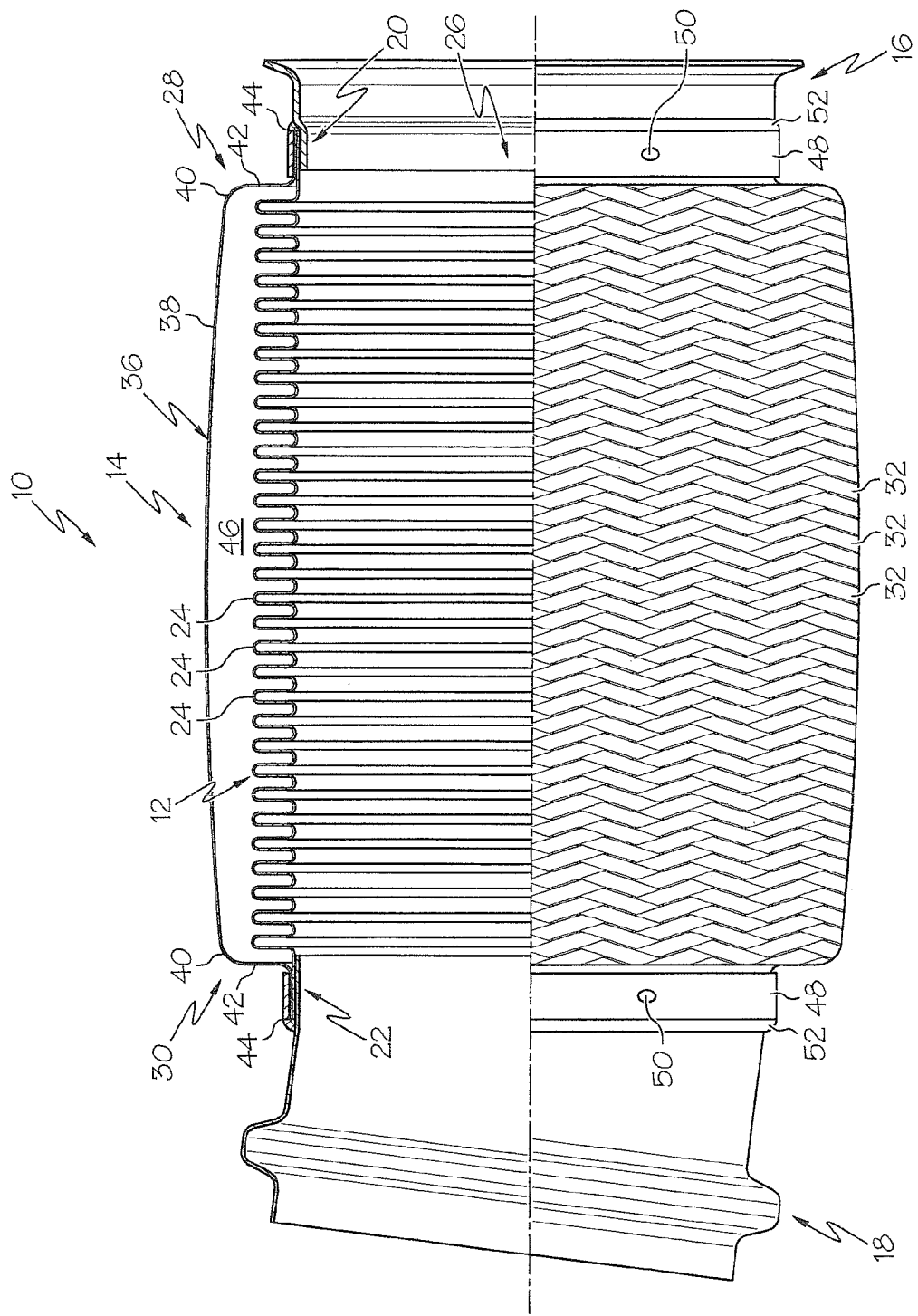
FIG. 2 is a cut-away side view of an exhaust connection coupler in accordance with one embodiment of the present invention.
Figure 3:
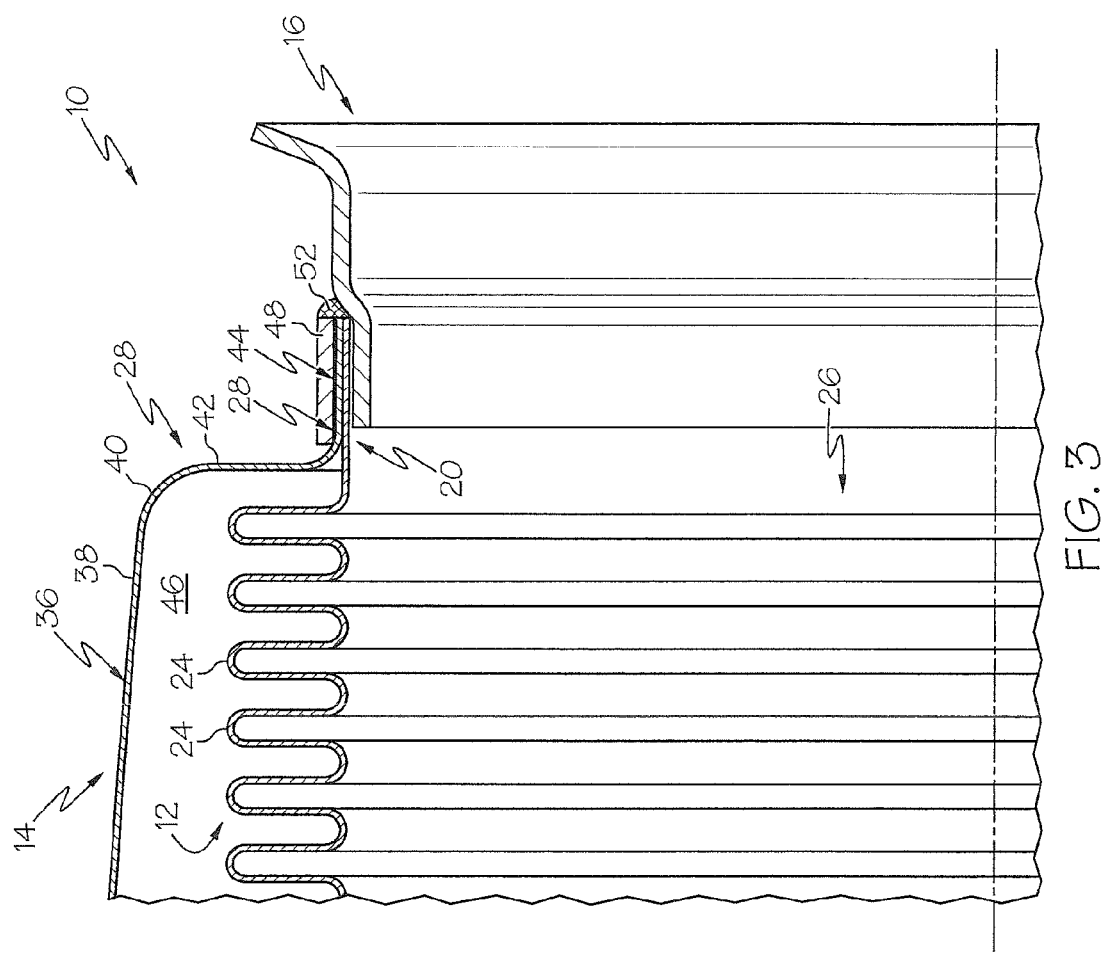
FIG. 3 is an enlarged fragmentary cross-sectional side view of an exhaust connection coupler in accordance with one embodiment of the present invention.

As illustrated in FIGS. 2 and 3, the braid cover 14 surrounds an outer periphery of the bellows member 12. The braid cover 14 serves to dampen vibrations, protect the bellows member 12, prevent elongation of the bellows member 12 under pressure and form a thermally insulating dead space around the bellows member 12 in order to maintain heat within the exhaust gases flowing therethrough.

The braid member 14 is formed of many ribbon-like bundles 32 of parallel metallic wire filaments 78. In one embodiment, the bundles 32 are fashioned from a plurality of metal wires filaments 78 that are generally in side by side contact with one another to form a substantially solid ribbon. The bundles 32 may be intertwined (e.g., interlaced, braided, knitted, woven, looped or the like) together on an elongated mandrel (not shown) to form a flexible, fabric-type cylindrical article.

Figure 4:
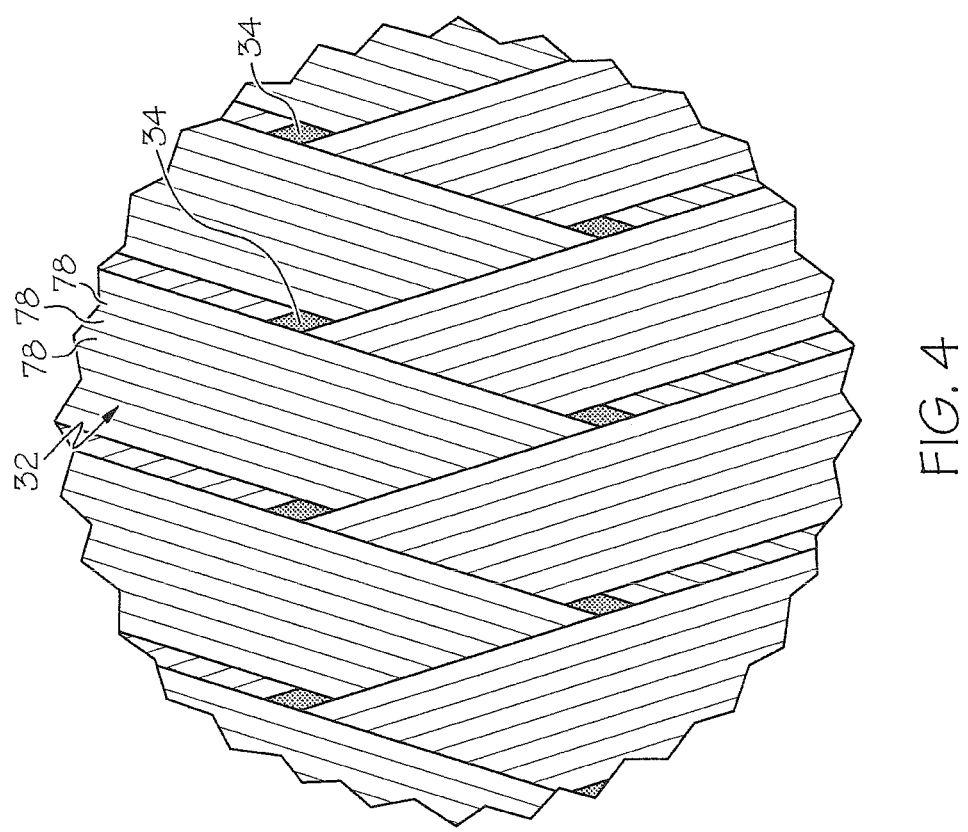
FIG. 4 is a partially enlarged view illustrating the manner and density at which wire elements may be braided in order to form a cover member in accordance with one embodiment of the present invention.
Figure 5:
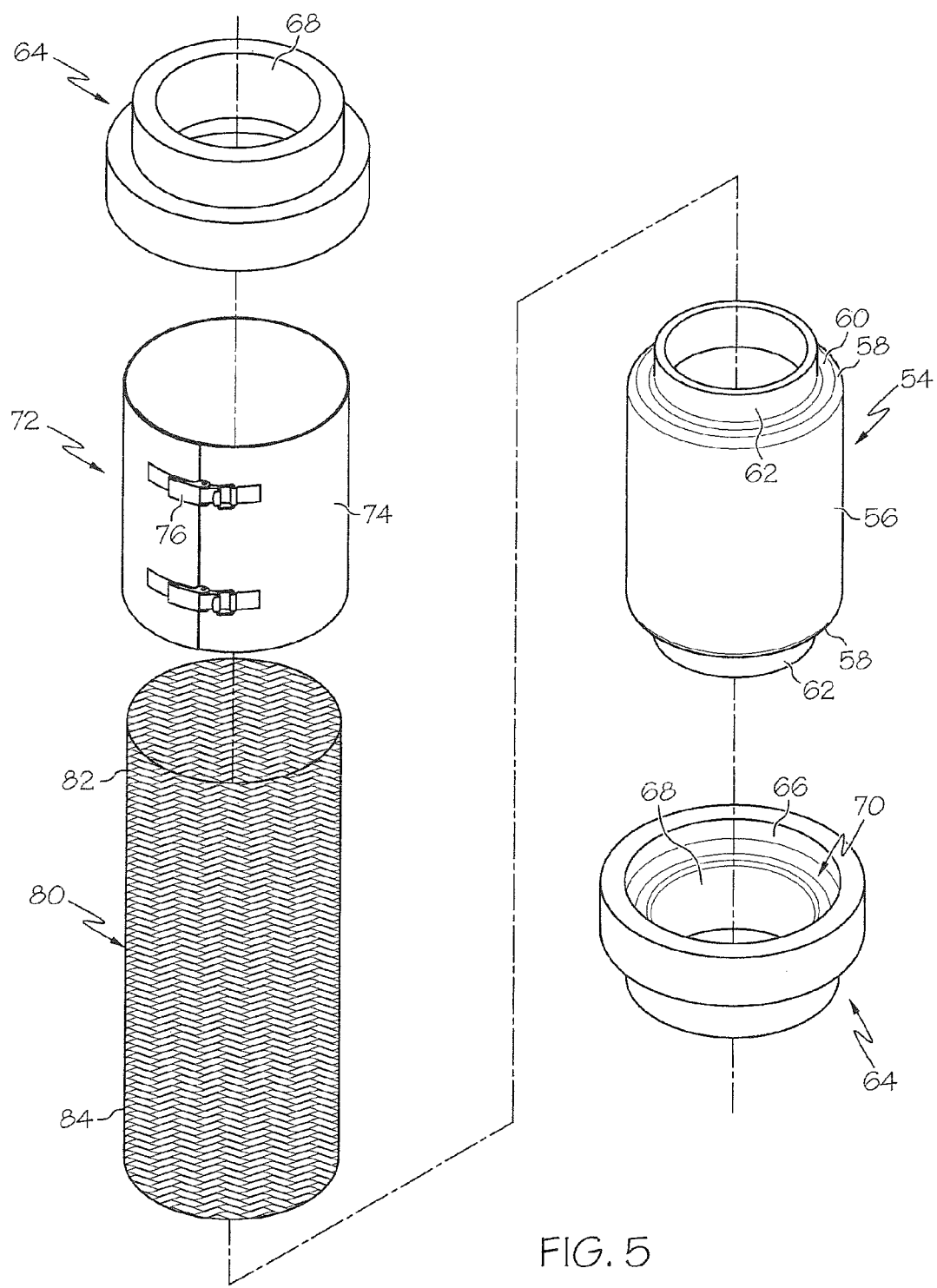
FIG. 5 is an exploded side perspective view of a portion of the tooling used to form the braid cover in accordance with one embodiment of the present invention.
Figure 6:
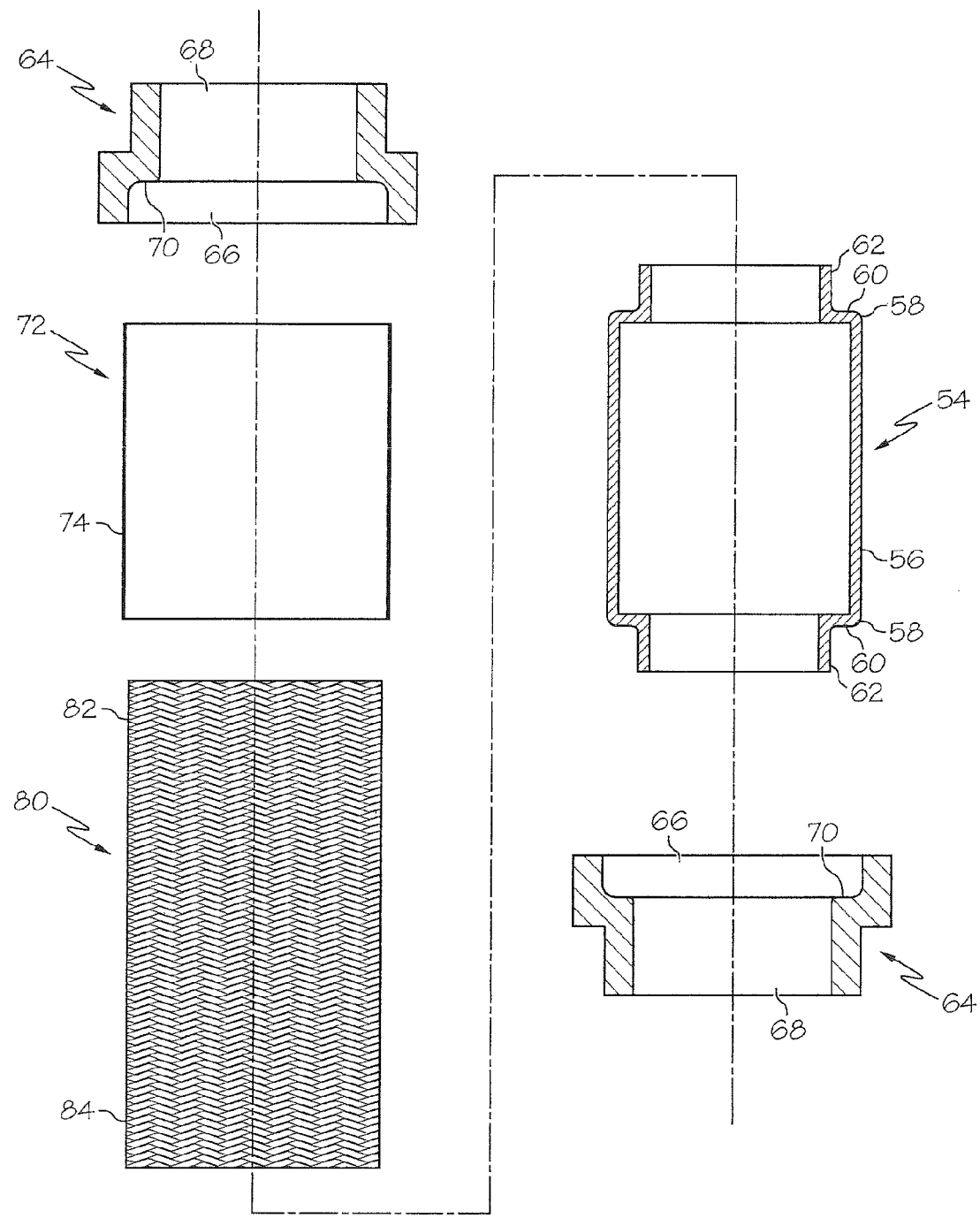
FIG. 6 is an exploded cross-sectional side perspective view of a portion of the tooling used to form the braid cover in accordance with one embodiment of the present invention.

As seen in FIG. 4, two opposing inside edges of two adjacent bundles 32 (extending parallel to each other in a first spiral direction) and two opposing inside edges of two other adjacent bundles 32 (extending parallel to each other in a second spiral direction) cooperate to define a slight rectangular or diamond-shaped aperture 34. In order for the braid cover 14 to effectively form a thermally insulating layer around the air space 46 defined between the bellows member 12 and the braid cover 14, the braid cover 14 needs to have a tight pattern in order to provide a dense coverage. The overall total opening of the apertures 34 with respect to the overall area of the outer surface of the cover 14 should be between about 0.5% and 20%, and more preferably between about 0.5% and 10%. This high-density pattern is the result of tightly intertwining a plurality of metal wire bundles 32. The high-density pattern results in a braid cover 14 wherein only a very minimal amount of air from the air space 46 may permeate therethrough. The combination of the air gap 46 and the high-density braid cover 14 serves to reduce the amount of heat that is lost from the exhaust gases as they travel though the coupler 10. The air gap 46 acts as a thermally insulating dead air space surrounding the bellows member 12 to maintain heat within the exhaust gas flowing through the coupler 10. The braid cover's 14 high-density pattern further provides the bellows member 12 with increased protection from water, melting salt, sand, gravel and other road debris.

As depicted, the braid cover's first and second ends 28 and 30 are formed into shape such that a middle body portion 36 of the cover 14 is maintained at a predetermined space from and is not in contact with the bellow corrugations 24. This not only prevents wearing and premature failure of the bellows member 12 and braid cover 14 thereby resulting in the coupler 10 having a longer life, but also serves to create the insulating air gap 46 defined between the bellows member 12 and braid cover 14. Each end 28 and 30 may be reduced to form a neck portion 44 having a smaller diameter than the body portion 36. Stated differently, the body portion 36 may extend radially outwardly from and have a larger diameter than each neck portion 44. The body portion 36 and at least one of the neck portions 44 may be generally cylindrical in shape.

As shown in the figures, each end 28 and 30 is formed to include a neck 44 and a shoulder 42 extending radially outwardly from the neck 44 to meet the body portion 36 at a corner 40. The shoulder 42 and the body portion's wall 38 may converge so as to be generally perpendicular with one another. This, in combination with the corner 40 having a relatively small radius and the bundles 32 being tightly braided, establishes increased rigidity in the braid cover 14 such that the body portion 36 may be self-supporting between the two shoulders 42. Unlike the known prior art having an outer braid cover disposed an appreciable distance from the bellows, embodiments of the braid cover 14 in the present invention do not require any additional support means in order to maintain a predetermined space from the bellows member corrugations 24. It should be noted, however, that the angle in which the shoulder 42 meets the wall 38 may be greater than or less than 90 degrees and the corners 40 may be of any suitable radius, so long as the body portion 36 maintains adequate rigidity to be self supporting between the shoulders 42.

While both ends 28 and 30 of the braid member 14 are shown as being formed into substantially the same shape in the figures, it should be understood that the two ends 28 and 30 may be formed into different shapes or that, alternatively, only one end 28 may be formed into a desired shape while the other end 30 may remain in the in generally the same shape as when formed on the mandrel.

The bellows member ends 20 and 22 may be combined with or secured to the braid cover ends 28 and 30, respectively, with a retainer. The retainer may be comprised of a support ring or collar 48, a spot weld 50, a clamping member, any suitable fastener, or any combination thereof. As best illustrated in FIG. 3, the retainer may also secure the bellow member ends 20 and 22 and braid cover ends 28 and 30 to an outer surface of the flanges 16 and 18. As shown in FIGS. 2 and 3, the end rings 48 are fit on the flanges 16 and 18 in such a manner as to sandwich the bellow member ends 20 and 22 together with the braid cover ends 28 and 30 between the end rings and flanges 16 and 18. As may be appreciated by a plurality of spot welds 50, the bellows member 12, the braid cover 14 and the end rings 49 may be integrally connected to each other by way of welding. The end rings 48 may further be secured to the flanges 16 and 18 by way of a weld 52 or other suitable attachment means. It should be understood, however, that the bellows member 12 and braid cover 14 may be coupled with the flanges 16 and 18 or directly to the exhaust pipes (not shown) by any suitable fastening means, including welding, clamping, riveting, bolting, screwing or the like. It should further be understood that the flanges 16 and 18 may be of any suitable shape and length and may comprise an elbow or offset angle if desired. Additionally, it will be appreciated that the end rings 48 may be of any suitable shape and may each include a flared or upturned end as is commonly known in the art.

Turning attention now to the manner in which the braid cover 14 is manufactured, focus is drawn toward FIGS. 5-8. As set forth above, wire filaments 78, in the form of bundles 32, may be intertwined (e.g., interlaced, braided, knitted, woven, looped or the like) together on an elongated mandrel (not shown) to form a flexible, sleeve-like cylindrical article 80 like that depicted in FIGS. 5 and 6. The sleeve-like article 80, which has first and second ends 82 and 84, may have a generally uniform cross-sectional area about its entire length. In the manufacturing process, the sleeve-like article 80 is formed into the braid cover 14.

Upon the construction of the sleeve-like article 80, one or both ends 82 or 84 of the article 80 are formed into shape so as to include a neck 44 and a shoulder 42 extending radially outwardly from the neck 44 which meets a body portion 36 at a corner 40, like described above and illustrated in FIG. 8 among others. This forming may be undertaken by any suitable method and through the use of a variety of tooling and equipment. In one embodiment, forming dies 54 and 64 are employed. As shown best in FIG. 6, the outer profile of a male forming die 54 and the inner profile of a female forming die 64 generally dictate the shape of the completed braid cover 14. In one embodiment, the sleeve-like article 80 is placed over or around the male forming die 54 which may inserted into a female fanning die 64 with the article 80 being located and compressed therebetween.

As shown, the male forming die 54 includes a body section 56 and ends having a neck section 62 and a shoulder section 60 extending radially outwardly from the neck section 62 and meeting the body section 56 at a corner 58. The cross-sectional area of the neck section 62 is less than the cross-sectional area of the body section 56. Thus, in one embodiment, the neck section may be generally cylindrical and have a diameter that is less than the diameter of the body section 56. Again, the outer profile of the male forming die 54 may generally dictate the shape of the finished braid cover 14.

The female forming die 64 may include an inner profile that generally resembles the outer profile of the male forming die 54. Depending upon the thickness of the article 80, the inner profile of the female forming die 64 may be slightly larger than the outer profile of the male forming die 54 so as to accommodate the article 80 therebetween. As shown, the female forming die 64 includes a first, larger diameter cavity portion 66 sized and shaped to accommodate at least a portion of the male forming die's body section 56 and a second, smaller diameter cavity portion 68 sized and shaped to accommodate at least a portion of the male forming die's neck section 62. A shoulder 70, resembling the shoulder 60 of the male forming dies 54, extends radially between the first and second cavity portions 66 and 68.

After the sleeve-like article 80 is formed, for example on a mandrel, it may be placed around the male forming die 54. Once on the male forming die 54, the article may be held against the body section 56 of the die 54 with a cinching or retaining device 72 that may be comprised of piece of sheet metal 74 and clamps or buckles 76. Any other suitable means for holding the article 80 against the die 54 may be used as well.

Figure 7:
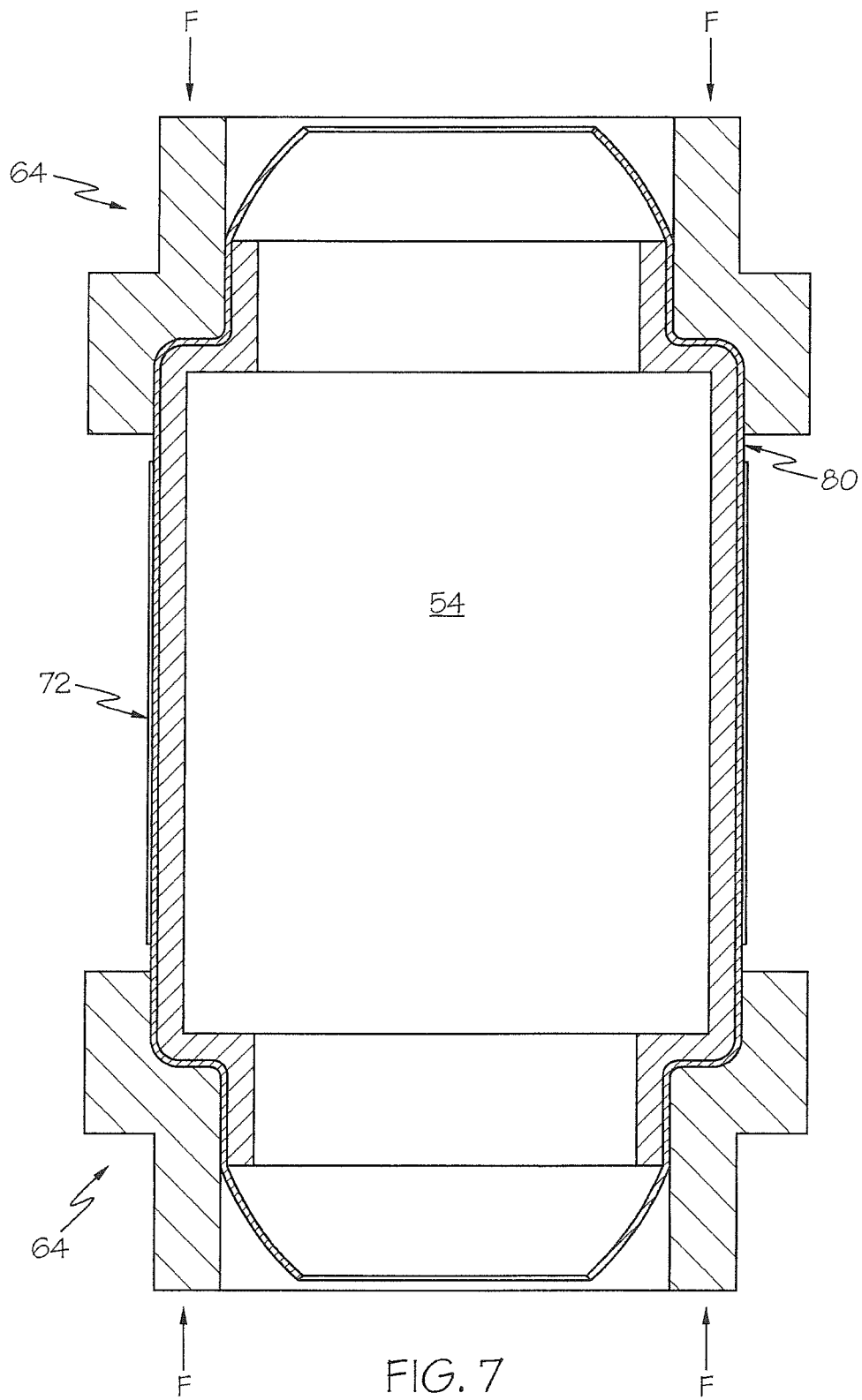
FIG. 7 is a cross-section side view of illustrating the braid cover being formed by tooling in accordance with one embodiment of the present invention.
Figure 8:
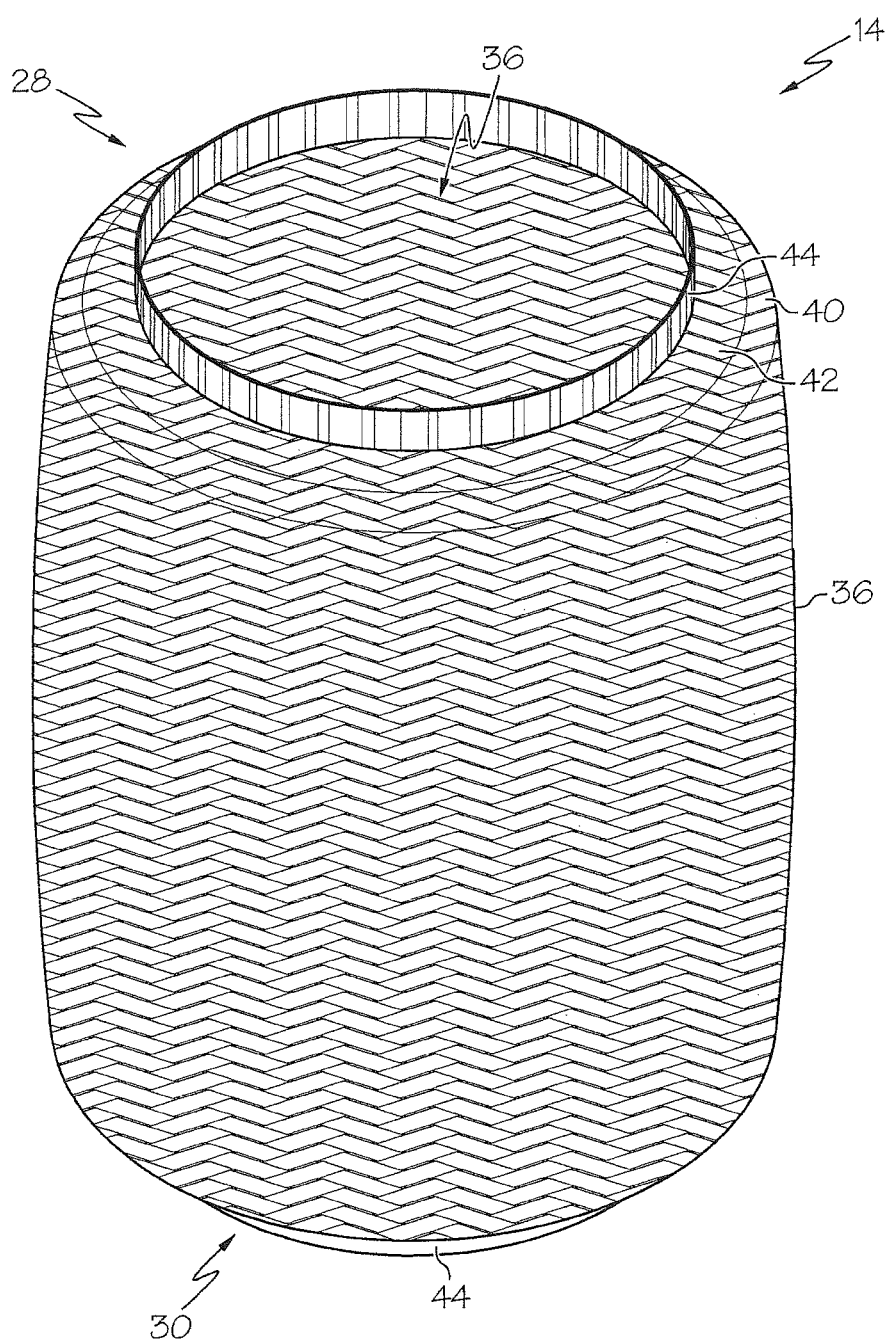
FIG. 8 is a side perspective view of a braid cover in accordance with one embodiment of the present invention.

As illustrated in FIG. 7, in order to form the sleeve-like article 80 into the braid cover 14, one or more end portions of the male forming die 54 with the article 80 placed therearound may be inserted into one or more female forming dies 64. The ends 82 and 84 of the article 80 are located and compressed between the male forming die 54 and one or more female forming dies 64. As shown in FIG. 7, the dies 54 and 64 may be aligned with one another and a force F applied in an axial direction to bring the dies 54 and 64 together with the article 80 therebetween. In one embodiment, the dies 54 and 64 are placed in a press (e.g., hydraulic, pneumatic or mechanical press) which generates the force F. In such an embodiment, one female forming die 64 may be mounted to a base of the press and a second female forming die 64 may be mounted to the press's ram. The male forming die 54 may be aligned and placed therebetween. Once in the male faulting die 54 is in position, the ram may be extended thereby compressing the male forming die 54 and article 80 between the two female forming dies 64 like shown in FIG. 7. When the ram is retracted, the retaining device 72 may be removed from around the sleeve 80 and the sleeve 80, which is now in the form of the braid cover 14, may be removed from the male forming die 54. One of the formed ends 28 or 30 may be slightly expanded in order to remove the braid cover 14 from the die 54. The material forming the end 28 or 30 may have "memory" and once removed from the die 54, the end 28 or 30 may generally contract back to the diameter it was formed into between the dies 54 and 64.

When the braid cover 14 has two formed ends 28 and 30, as shown in the figures, it is contemplated that the ends 28 and 30 may either me formed simultaneously or may be formed one at a time. Additionally, the braid cover 14 may only have one formed end 28 or 30. Further yet, it is within the scope of this invention that the braid cover 14 may be formed by intertwining the bundles 32 of wire filaments 78 onto a mandrel having a profile resembling the male forming die 54, as opposed to constructing a sleeve-like article 80 and then pressing the article 80 into shape with the dies 54 and 64.

Upon the formation of the sleeve 80 into the braid member 14, the braid member 14 may be assembled with the remainder of the coupler 10 as in FIGS. 1-3.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of manufacturing an exhaust system coupler, said method comprising the steps of:
   selecting a flexible bellows member made of metallic material and having a generally cylindrical and repeatedly corrugated shape;
   manufacturing an intertwined cover member, wherein manufacturing the intertwined cover member comprises;
   providing a plurality of wire filaments;
   intertwining said wire filaments to form a sleeve having first and second ends; and
   forming at least one end of said sleeve into shape using a forming die such that said end includes a circumferential neck portion and a shoulder that is generally perpendicular to a body portion of the cover member;
   positioning the intertwined cover member over the flexible bellows member such that the shoulder is spaced apart from and not in contact with end most corrugations of said bellows member; and
   securing a retainer to the flexible bellows member and the intertwined cover member to combine end parts of the flexible bellows member and the intertwined cover member.

2. The method of claim 1, wherein said forming die is a male forming die that includes a body with a first cross-sectional area and a neck with a second cross-sectional area being less than said first cross-sectional area.

3. The method of claim 2 further comprising the step of inserting said male forming die with said sleeve wrapped therearound into a female forming die having a first cavity shaped for receiving at least a portion of said male forming die body and a second cavity shaped for receiving at least a portion of male forming die neck.

4. The method of claim 3, wherein said sleeve is compressed between said male and female forming dies such that said at least one sleeve end takes the general shape of an outer surface of said male mold member.

5. The method of claim 3, wherein said male forming die and female forming die are joined together in a press with a portion of said sleeve being captured therebetween.

6. The method of claim 1, wherein said wire filaments are braided onto a mandrel to form said sleeve.

7. A method of manufacturing an exhaust system coupler, said method comprising the steps of:
   selecting a flexible bellows member made of metallic material and having a generally cylindrical and repeatedly corrugated shape;
   manufacturing an intertwined cover member, wherein manufacturing the intertwined cover member comprises;
   providing a tubular sleeve formed of braided wire filaments, said sleeve including first and second ends and a body portion extending therebetween having a first diameter;
   forming at least one end of said sleeve into shape using a forming die such that said end includes a circumferential neck portion having a second diameter smaller than said first diameter and a shoulder extending radially outwardly from, and generally perpendicular to, said neck portion and meeting said body portion at a stiffened corner; and
   positioning the intertwined cover member over the flexible bellows member such that the shoulder is spaced apart from and not in contact with end most corrugations of said bellows member; and
   securing a retainer to the flexible bellows member and the intertwined cover member to combine end parts of the flexible bellows member and the intertwined cover member.

8. The method of claim 1, wherein said forming die comprises a male forming die that includes a body having an outer diameter approximately equal to said first diameter and a neck having an outer diameter approximately equal to said second diameter.

9. The method of claim 8, wherein said forming die further comprises a female forming die having a first cavity shaped for receiving at least a portion of said male forming die body and having a diameter approximately equal to said first diameter and a second cavity shaped for receiving at least a portion of male forming die neck and having a diameter approximately equal to said second diameter.

10. The method of claim 7, wherein said sleeve is compressed between male and female forming dies such that said at least one sleeve end takes the general shape of an outer surface of said male forming die.

11. The method of claim 7 further comprising the step of inserting a male forming die with said sleeve wrapped therearound into a female forming die to form the neck portion and shoulder portion of said cover.

12. The method of claim 11 further comprising the step of placing a retaining device around said body portion of said sleeve to hold said body portion against said male forming die.

\* \* \* \* \*